United States Patent [19]

Grieves et al.

[11] Patent Number: 5,837,092
[45] Date of Patent: Nov. 17, 1998

[54] ADHESIVE PRIMER

[75] Inventors: Richard Grieves, Hillbrow; Kimleigh George Montague Pratley, Krugersdorp, both of South Africa

[73] Assignee: Pratley Investments (Proprietary) Limited, South Africa

[21] Appl. No.: 18,356

[22] Filed: Feb. 16, 1993

Related U.S. Application Data

[63] Continuation of Ser. No. 619,021, Nov. 28, 1990, abandoned.

[30] Foreign Application Priority Data

Aug. 27, 1990 [ZA] South Africa ............................ 90/6778

[51] Int. Cl.$^6$ ........................................................ C09J 5/04
[52] U.S. Cl. .............. 156/314; 106/287.26; 106/287.3; 156/331.2; 526/298; 564/503; 564/511
[58] Field of Search ................................ 156/314, 331.2; 106/287.26, 287.3; 526/298; 564/503, 511

[56] References Cited

U.S. PATENT DOCUMENTS

| | | | |
|---|---|---|---|
| 2,716,134 | 8/1955 | Reynolds et al. | 564/511 |
| 2,944,030 | 7/1960 | Patton | 564/503 |
| 3,236,835 | 2/1966 | Rabour | 564/511 |
| 3,260,637 | 7/1966 | von Bramer | 156/314 |
| 3,647,513 | 3/1972 | Jackson . | |
| 3,812,003 | 5/1974 | Larson . | |

FOREIGN PATENT DOCUMENTS

| | | |
|---|---|---|
| 0295013 | 12/1988 | European Pat. Off. . |
| 0295930 | 12/1988 | European Pat. Off. . |
| 0333448 | 9/1989 | European Pat. Off. . |
| 0295013 | 4/1992 | European Pat. Off. . |
| 0295930 | 4/1992 | European Pat. Off. . |
| 0333448 | 6/1992 | European Pat. Off. . |
| 43-5004 | 2/1968 | Japan ................................ 156/314 |
| 973902 | 11/1964 | United Kingdom . |

OTHER PUBLICATIONS

Ito et al, "Primers for bonding plastics with cyanoacrylate adhesives," CA Selects; Adhesives, Issue 16, 1990 p. 5 (JP 02120378) Abstract only.

Fukushige et al, "Primers for α cyanoacrylate adhesives", CA Selects; Adhesives, Issue 20, 1990, p. (JP 02120378) Abstract only Ito et al, "Primers for cyanoacrylate adhesives on nonpolar or highly crystalline plastics," CA Selects; Adhesives, Issue 19, 1990, p. 11 (JP 02117967) Abstract only.

*Primary Examiner*—John J. Gallagher
*Attorney, Agent, or Firm*—Ladas & Parry

[57] ABSTRACT

A primer for the promotion of bonding of a first plastic substrate to a second plastic substrate, which plastic substrates may either be made of a plastics material which conventionally is difficult to bond or of a plastics material which conventionally is not difficult to bond, with an adhesive such as a cyanoacrylate, consists of a compound of the formula I:

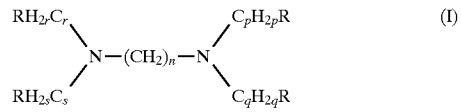

wherein —$(CH_2)_n$— is a straight or branched chain alkyl group of 1 to 6 carbon atoms inclusive; p, q, r and s are each independently 1 to 6 inclusive; and each R is independently —$CH_3$ or —OH.

1 Claim, No Drawings

ADHESIVE PRIMER

This is a continuation of application Ser. No. 07/619,021 filed on Nov. 28, 1990, now abandoned.

BACKGROUND OF THE INVENTION

This invention relates to a primer for the promotion of bonding of a first plastic substrate to a second plastic substrate with an adhesive, to a primer composition containing the primer and a solvent therefor, to a two-component adhesive system comprising an adhesive and the primer, and to a method of bonding a first plastic substrate to a second plastic substrate using the primer.

It is well known in the adhesive field that there are plastic substrates made from certain types of plastics materials which are extremely difficult to bond with generally used adhesives, for example cyanoacrylate adhesives. Such difficult to bond plastics materials include low surface energy plastics such as polyethylene and polypropylene and highly crystalline materials such as polyacetals and polybutylene terephthalate. As a consequence of the difficulty in bonding substrates made from these plastics materials with adhesives, various surface treatments have been employed where such materials require bonding. Examples of such surface treatments include corona discharge exposure of the substrate surface, acid etching, plasma treatment and the like. However these methods have generally proved unsatisfactory and are clearly not applicable to the bonding of plastic substrates in the domestic or household sphere.

In addition, various primer compositions have been developed which are designed to be applied to the plastic substrate to be bonded prior to application of the adhesive.

In EP 295013 to Loctite (Ireland) Limited there is disclosed a primer which comprises a primary aliphatic amine of the general formula:

$$R-NH_2$$

wherein R is an aliphatic group having at least 6 carbon atoms and the R group may be branched or straight chained. The preferred primer is n-octylamine. The primer may be dissolved in a solvent and then applied to the substrate to be bonded.

In EP 295930 to Loctite (Ireland) Limited there is disclosed a primer which comprises 1,5-diazabicyclo[4.3.0]non-5-ene, 1,8-diazabicyclo[5.4.0]-undec-7-ene or 1,5,7-triazabicyclo [4.4.0]dec-5-ene. The primer is again intended to be used dissolved in a suitable solvent.

In EP 333448 to Loctite Corporation there is disclosed a primer for bonding of surfaces with cyanoacrylate adhesives which comprises a quaternary ammonium compound of the formula

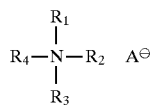

wherein $R_1$, $R_2$, $R_3$ and $R_4$ may each vary independently of the others and are each selected from the group consisting of alkyl, hydroxyalkyl, aryl, alkaryl, aralkyl and alkenyl, optionally substituted by heteroatoms, and $A^\ominus$ is an anion whose $pK_A$ value in deprotonation equilibrium reaction is greater than about 0. A preferred quarternary ammonium salt is tetra-n-butyl ammonium fluoride.

In Japanese Patent No 0245572 to Toa Gosei Chemical Industry Company Limited there are disclosed primers for bonding plastics with cyanoacrylate adhesives which are imidazoles. A preferred example is given as 2-methylimidazole in a solution of $MeCCl_3$.

In Japanese Patent No 02120378 to Koatsu Gas Kogyo Co Ltd there are disclosed primers for nonpolar and highly crystalline resins of the formula $$PR_3$$

wherein $R_3$ is alkyl. A preferred primer is given as $P Bu_3$ in toluene.

In Japanese Patent No 02117967 to Toa Gosei Chemical Industry Co Ltd there are disclosed primers which are organic zirconium compounds and in particular zirconium acetylacetonate $Zr(C_6H_7O_2)_4$.

While all these disclosed primers are of some use in the bonding of difficult-to-bond plastic substrates which are composed of plastics materials which are either highly crystalline or have low energy surfaces (i.e. are nonpolar), these primers are generally not of use in priming other plastic substrates composed of plastics materials such as for example acrylonitrile-butadiene-styrene (ABS), polycarbonate, nylon, polymethylmethacrylate, polyvinyl chloride and polystyrene. Thus, up to now it has not been possible to formulate a primer and a two-component adhesive composition containing an adhesive and a primer which may be used for the bonding of all types of plastic substrates.

SUMMARY OF THE INVENTION

According to a first aspect of the invention there is provided a primer for the promotion of bonding of a first plastic substrate to a second plastic substrate with an adhesive which consists of a compound of the formula:

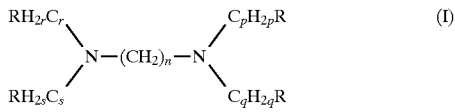

wherein $-(CH_2)_n-$ is a straight or branched chain alkyl group of 1 to 6 carbon atoms preferably 2 to 6 carbon atoms inclusive; p, q, r and s are each independently 1 to 6 inclusive; and each R—H or —OH.

The first plastic substrate may be composed of the same type of plastics material as the second plastic substrate or the first plastic substrate may be composed of a different plastics material from the second plastic substrate. The plastics material from which the first and second plastic substrates are made may be a plastics material which is conventionally difficult to bond, e.g. a plastics material characterized by a low surface energy such as low density polyethylene, linear low density polyethylene, high density polyethylene, polytetrafluoroethylene, ethylenepropylenediamine polymethylene (EPDM) rubber, and thermoplastic rubbers based on polyolefins as well as other plastics materials which are conventionally not difficult to bond such as ABS, polycarbonate, nylon, polymethylmethacrylate, polyvinyl chloride and polystyrene.

Preferred primers of the invention include those of the formula:

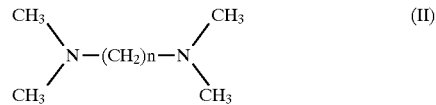

wherein $-(CH_2)n-$ is a straight or branched chain alkyl group of 2 to 6 carbon atoms inclusive.

Examples of primers of the invention include:

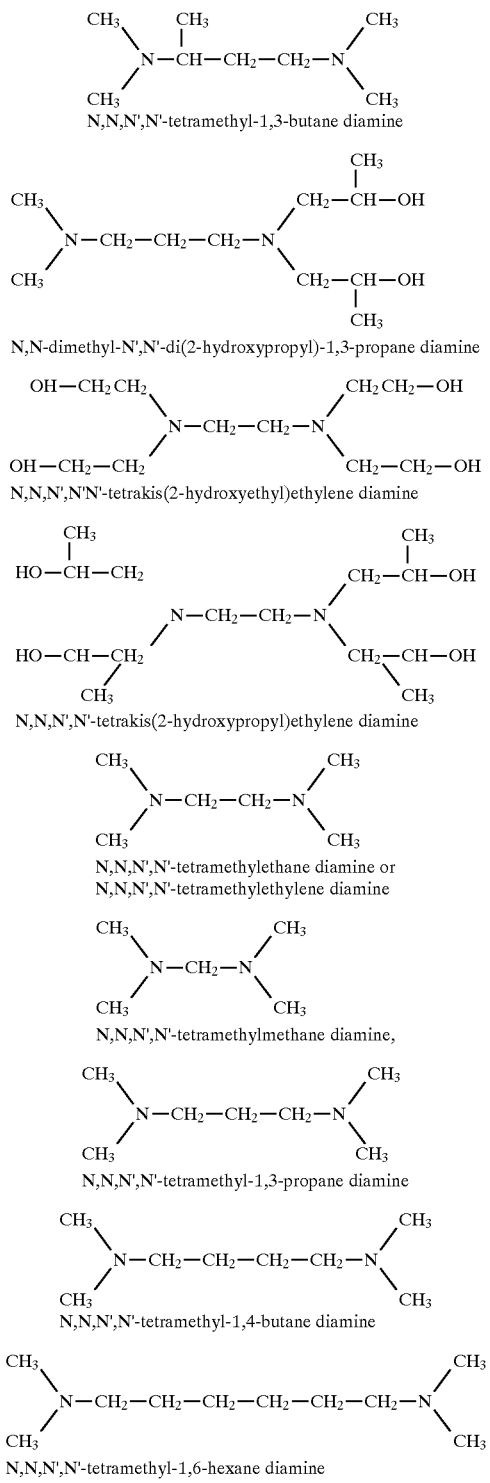

N,N,N',N'-tetramethyl-1,3-butane diamine (III)

N,N-dimethyl-N',N'-di(2-hydroxypropyl)-1,3-propane diamine (IV)

N,N,N',N'N'-tetrakis(2-hydroxyethyl)ethylene diamine (V)

N,N,N',N'-tetrakis(2-hydroxypropyl)ethylene diamine (VI)

N,N,N',N'-tetramethylethane diamine or N,N,N',N'-tetramethylethylene diamine (VII)

N,N,N',N'-tetramethylmethane diamine, (VIII)

N,N,N',N'-tetramethyl-1,3-propane diamine (IX)

N,N,N',N'-tetramethyl-1,4-butane diamine (X)

N,N,N',N'-tetramethyl-1,6-hexane diamine (XI)

According to a second aspect of the invention there is provided a primer composition for the promotion of bonding of a first plastic substrate to a second plastic substrate with an adhesive which comprises:

(a) a primer which is a compound of the formula (I) above or a mixture of two or more compounds of the formula (I) above or a mixture of a compound of the formula (I) above and another primer for the promotion of bonding of a first plastic substrate to a second plastic substrate; and (b) a solvent for the primer or primers.

Other primers which may be combined with the primers of the invention include n-octylamine and zirconium acteylacetonate.

Suitable solvents for the primer are organic solvents which dissolve the primer. An example of a suitable solvent is Freon TA (trademark of E I Du Pont de Nemours & Co Inc) which is an azeotrope of acetone and 1, 1,2-trichloro-1,2,2-trifluroethane.

According to a third aspect of the invention there is provided a two-component adhesive system which comprises:

(c) a primer for the promotion of bonding of a first plastic substrate to a second plastic substrate with an adhesive which is a compound of the formula (I) above or a mixture of two or more compounds of the formula (I) above or a mixture of a compound of the formula (I) above and another primer for the promotion of bonding of a first plastic substrate to a second plastic substrate; and (d) a suitable adhesive, preferably a cyanoacrylate adhesive.

According to a fourth aspect of the invention there is provided a method of bonding a first plastic substrate to a second plastic substrate with an adhesive which comprises the steps of:

(i) treating the first plastic substrate or the second plastic substrate or both the first plastic substrate and the second plastic substrate with a primer for the promotion of bonding of the two plastic substrates with an adhesive, which primer is a compound of the formula (I) above or a mixture of two or more compounds of the formula (I) above or a mixture of a compound of the formula (I) above and another primer for the promotion of bonding of a first plastic substrate to a second plastic substrate;

(ii) applying an adhesive to the first plastic substrate or to the second plastic substrate or to both the first plastic substrate and the second plastic substrate; and (iii) adhering the first plastic substrate to the second plastic substrate.

DESCRIPTION OF EMBODIMENTS

The crux of the invention is a primer for the promotion of bonding of a first plastic substrate to a second plastic substrate, which plastic substrates may either be made of a plastics material which conventionally is difficult to bond, or of a plastics material which conventionally is not difficult to bond. Thus, the primer of the invention permits the production of a two-component adhesive system for sale to and use in the domestic market, i.e. in a household and in the industrial market for the adhesion of all types of plastics to one another.

The primer of the invention is a compound of formula (I) as set out above, which compound is a linear compound containing a carbon-linked double tertiary amine unit.

Preferred primers of the invention are those with the formula (II) above, where the two nitrogen atoms are substituted simply by methyl groups.

Particularly preferred primers of the invention are those of formulae (III) to VII and (XI) set out above.

The primer of the invention may be used as is, but is preferably used as a primer composition dissolved in a suitable solvent for the primer which will generally be an organic solvent. The primer and primer composition of the invention promote the bonding of two plastic substrates to each other whether the two plastic substrates are made of a so-called low surface energy plastics material or a highly crystalline plastics material which are normally difficult to bond, or whether the substrates are made of other plastics materials which conventionally are not difficult to bond, or a combination of the two. Certain of the primers of the invention work better on those substrates made of plastics materials which are difficult to bond while other primers of the invention work better on those substrates which are made of plastics materials which are conventionally not difficult to bond.

The primers of the invention may also be used to promote the bonding of a substrate made of a plastics material to a substrate made of another type of material such as metal or wood.

The primers of the invention may also be used in combination with other primers for the promotion of bonding of a first plastic substrate to a second plastic substrate, e.g. a combination of compound IV with n-octylamine (disclosed in EP295013) or zirconium acetylacetonate (disclosed in JP 02120378).

A third aspect of the invention is a two-component adhesive system which comprises (c) a primer of the invention, and (d) a suitable adhesive preferably a cyanoacrylate adhesive.

Suitable cyanoacrylate adhesives for use with the primer of the invention may be represented by the general formula:

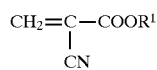

wherein $R^1$ is alkyl, alkenyl, cycloalkyl, aryl, alkoxyalkyl, aralkyl, haloalkyl or another suitable group.

The lower alkyl α-cyanoacrylates are preferred and in particular ethyl α-cyanoacrylate.

Many α-cyanoacrylates can be obtained commercially as one component instant adhesives in which form they may be used in this invention. An example is Pratley Super Glue (an ethyl cyanoacrylate supplied by Pratley Polmers Limited).

The adhesive may also contain, in addition to the adhesive agent, stabilizers, thickeners, adhesion promoters, plasticizers, dyes, heat-resistant additives, impact resistance modifiers, perfumes, and the like.

A diluted solution of the cyanoacrylate adhesive in a compatible solvent may also be used.

The fourth aspect of the invention is a method of bonding a first plastic substrate to a second plastic substrate with an adhesive which comprises the steps of:

(i) treating the first plastic substrate or the second plastic substrate or both with the primer of the invention;

(ii) applying an adhesive, preferably a cyanoacrylate adhesive to either the first plastic substrate or the second plastic substrate or both the first plastic substrate and second plastic substrate; and (iii) adhering the first plastic substrate to the second plastic substrate.

Generally, the primer will be applied to both the first and the second plastic substrates. However, where one of the plastic substrates is composed of a plastics material which is not difficult to bond and the other plastic substrate is composed of a plastics material which is conventionally difficult to bond, then it may only be necessary to apply the primer to the plastic substrate composed of the material which is conventionally difficult to bond.

Likewise, the adhesive will generally be applied to both the first plastic substrate and the second plastic substrate, although it is possible to apply the adhesive to only one of the first plastic substrate or the second plastic substrate.

After the plastic substrates have been primed and coated with the adhesive, they are then adhered to each other. The resulting adhesion between the first plastic substrate and the second plastic substrate is promoted and accelerated and the bond between the two is strengthened over that which can be achieved without the primer of the invention.

The use of the primers of the invention with a conventional cyanoacrylate adhesive is illustrated in the examples set out below.

Bonding tests were carried out according to British Standards, BS 5350, Part C5 in single lap shear, using a J J Lloyd tensometer T30K, at a pulling rate of 10 mm/min. The test pieces were 100 mm×25 mm×5 mm.

All primers were dissolved in Freon TA, which is an acetone/trichlorotrifluoroethane azeotrope supplied by E I Du Pont de Nemours & Co Inc and the primer concentration was 0,1%. The primer composition was applied to the test pieces and allowed to dry for 3 minutes in air. The test pieces were bonded using Pratley Super Glue (an ethyl cyanoacrylate supplied by Pratley Polymers Limited).

The overlap area was 125 mm². All lap shear adhesion strengths are in MPa.

Table 1 shows the results when the adhesive was allowed to cure for 10 minutes, compared to a control using no primer.

The primers used were: N,N,N',N' Tetramethylethylene diamine (Compound VII) N,N,N',N' Tetramethyl-1,3-butane diamine (Compound III) N,N-dimethyl-N',N'-di(2-hydroxyproply)-1,3-propane diamine (Compound IV).

TABLE 1

| SUBSTRATE | Control | IV | VII | III |
|---|---|---|---|---|
| Low Density Polyethylene | Nil | 0,97 | 0,15 | 1,36 |
| Linear Low Density Polyethylene | Nil | 1,48 | 0,15 | 1,00 |
| High Density Polyethylene | Nil | 0,88 | 1,11 | 2,84 |
| Prolypropylene Homopolymer | Nil | 3,75 | 2,81 | 5,70 |
| Silicone Rubber | Nil | >1,1 | 0,63 | >1,1 |
| Polyacetal Homopolymer | Nil | 0,56 | 0,67 | 1,02 |
| Polytetrafluroethylene | Nil | 2,66 | 1,04 | 1,19 |
| Santoprene* | Nil | >0,88 | 0,76 | >0,88 |
| EPDM Rubber | 0,30 | >1,60 | >1,60 | >1,60 |
| Nylon [Polyamide] | Nil | 1,14 | 3,42 | 2,07 |
| Polycarbonate | Nil | 0,16 | 5,1 | 3,07 |
| Polymethylmethacrylate | Nil | 0,63 | 2,21 | >8,2 |
| Polyvinyl chloride | >7,2 | >7,2 | 0,74 | >7,2 |
| ABS | 2,59 | 2,60 | 6,75 | 2,21 |
| Polystyrene | 0,85 | 2,98 | 6,48 | 7,73 |

*Santoprene is a thermoplastic rubber which consists of an intimate mixture of polypropylene and EPDM rubber. It is supplied by Monsanto Inc.
>Strength, indicates that the substrate broke before the adhesive.

Table 2 shows the results when the adhesive was allowed to cure for 24 hours, compared to a control using no primer.

TABLE 2

| SUBSTRATE | Control | IV | VII | III |
|---|---|---|---|---|
| Low Density Polyethylene | Nil | 4,3 | 0,76 | 3,05 |
| Linear Low Density Polyethylene | 0,20 | 5,59 | 1,25 | 5,79 |
| High Density Polyethylene | 0,92 | 3,00 | 4,01 | 5,54 |
| Prolypropylene Homopolymer | 0,68 | 6,15 | 8,41 | 9,77 |

TABLE 2-continued

| SUBSTRATE | Control | IV | VII | III |
|---|---|---|---|---|
| Silicone Rubber | Nil | >1,10 | >1,10 | >1,10 |
| Polyacetal Homopolymer | 0,92 | 2,44 | 3,11 | 6,91 |
| Polytetrafluroethylene | 0,76 | 6,48 | 5,67 | 9,16 |
| Santoprene* | 0,48 | >0,88 | >0,88 | >0,88 |
| EPDM Rubber | >1,60 | >1,60 | >1,60 | >1,60 |
| Nylon [Polyamide] | 9,35 | 1,97 | 8,04 | 10,13 |
| Polycarbonate | 11,11 | 7,03 | 9,57 | 17,41 |
| Polymethylmethacrylate | 2,08 | 1,70 | >8,2 | >8,2 |
| Polyvinyl chloride | >7,2 | >7,2 | >7,2 | >7,2 |
| ABS | >9,6 | >9,6 | >9,6 | >9,6 |
| Polystyrene | >7,6 | 2,18 | >7,6 | >7,6 |

Tables 1 and 2 show the excellent results achieved on all substrates by Compound III, but particularly after a 10 minute cure. Compound IV is good on low surface energy substrates, particularly linear low density polyethylene.

Table 3 compares 0,1% solutions of the following primers in Freon TA with a control using no primer Bis(dimethylamino)methane or N,N,N',N'-tetramethylmethane diamine (Compound VIII)

Bis(dimethylamino)ethane or N,N,N',N'-tetramethylethane diamine (Compound VII)

1,3-Bis(dimethylamino)propane or N,N,N',N'-tetramethyl-1,3-propane diamine (Compound IX)

1,3-Bis(dimethylamino)butane or N,N,N',N'-tetramethyl-1,3-butane diamine (Compound III)

1,4-Bis(dimethylamino) butane or N,N,N',N'-tetramethyl-1,4-butane diamine (Compound X)

1,6-Bis(dimethylamino)hexane or N,N,N',N'-tetramethyl-1,6-hexane diamine (Compound XI)

The adhesive was cured for 24 hours and the lap shear strengths are given in MPa.

TABLE 3

| SUBSTRATE | Control | VIII | VII | IX | III | X | XI |
|---|---|---|---|---|---|---|---|
| Low Density Polyethylene | Nil | 0,20 | 0,76 | 2,84 | 3,05 | 2,64 | 1,97 |
| High Density Polyethylene | 1,05 | 1,28 | 4,01 | 2,81 | 5,54 | 4,19 | 4,96 |
| Polypropylene Homopolymer | 0,68 | 3,68 | 8,41 | 5,63 | 9,18 | 10,63 | 8,93 |
| Nylon [Polyamide] | 9,35 | 6,08 | 8,04 | 10,11 | 10,13 | 4,75 | 2,78 |
| Polycarbonate | 11,11 | 15,63 | 9,57 | 12,89 | 17,41 | 18,50 | 11,61 |
| Polymethyl Methacrylate | 2,08 | >8,2 | >8,2 | >8,2 | >8,2 | >8,2 | 5,62 |

Table 4 compares different concentrations of Compound IV used as a primer on low density polyethylene. The cure time was 24 hours and lap shear results are given in MPa.

TABLE 4

| 0,5% IV | 2,19 |
|---|---|
| 0,25% IV | 3,33 |
| 0,1% IV | 4,30 |
| 0,05% IV | 3,72 |

Table 4 shows that a 0,1% concentration is preferable, but that concentration is not especially important.

Table 5 gives results of 0,1% solutions of the following three primers and compares them with a control using Pratley Super Glue, but no primer.

Compound IV

N,N,N',N'-tetrakis(2-hydroxyethyl)ethylene diamine or 2,2',2",2"'-ethylenedinitrilo tetraethanol (Compound V)

N,N,N',N'-tetrakis(2-hydroxypropyl)ethylene diamine (Compound VI)

The adhesives were cured for 24 hours and the lap shear strengths are given in MPa.

TABLE 5

| SUBSTRATE | CONTROL | IV | V | VI |
|---|---|---|---|---|
| Low Density Polyethylene | Nil | 4,30 | 2,12 | 2,44 |
| High Density Polyethylene | 1,05 | 3,00 | 1,55 | 1,61 |
| Polypropylene Homopolymer | 0,68 | 6,15 | 10,19 | 5,58 |
| Nylon [Polyamide] | 9,35 | 1,97 | 4,34 | 4,79 |
| Polycarbonate | 11,11 | 7,03 | 9,37 | 14,23 |
| Polymethyl-methacrylate | 2,08 | 1,70 | 4,86 | 7,06 |

These results show that Compound IV has very high strength on LDPE and fair strength on HDPE and PPHP. Compound V and Compound VI have fair strengths on the low surface energy substrates and normal plastics.

Table 6 gives the results of priming a variety of surfaces with the primer 1,8 diazabicyclo [5,4,0] undec-7-ene [DBU] disclosed in EP 295930 and comparing it with Compound III. Both primers are dissolved in Freon TA at 0,1% and primed on both substrate surfaces. Control was Pratley Super Glue adhesive with no primer.

TABLE 6

| | 10 MINUTE CURE | | | 24 HOUR CURE | | |
|---|---|---|---|---|---|---|
| SUBSTRATE | Control | III | DBU | Control | III | DBU |
| Low Density Polyethylene | Nil | 1,36 | 1,30 | Nil | 3,05 | 2,92 |
| Linear Low Density Polyethylene | Nil | 1,0 | 1,26 | 0,20 | 5,79 | 6,10 |
| High Density Polyethylene | Nil | 2,84 | 1,08 | 0,92 | 5,54 | 3,76 |
| Prolypropylene | Nil | 5,70 | 3,80 | 0,68 | 9,77 | 11,7 |
| Silicone | Nil | >1,1 | 0,99 | Nil | >1,1 | >1,1 |
| Polyacetal | Nil | 1,02 | 1,40 | 0,92 | 6,91 | 2,99 |
| PTFE | Nil | 1,19 | 3,89 | 0,76 | 9,16 | 5,32 |
| Santoprene* | Nil | >0,88 | >0,88 | 0,48 | >0,88 | >0,88 |
| EPDM Rubber | 0,30 | >1,60 | >1,60 | >1,6 | >1,6 | >1,6 |
| Nylon | Nil | 2,07 | 0,92 | 9,35 | 10,13 | 2,03 |
| Polycarbonate | Nil | 3,07 | 1,56 | 11,11 | 17,41 | 2,68 |
| Polymethyl-methacrylate | Nil | >8,2 | 1,96 | 2,08 | >8,2 | >8,2 |
| PVC | >7,2 | >7,2 | 3,12 | >7,2 | >7,2 | >7,2 |
| ABS | 2,59 | 2,21 | 1,13 | >9,6 | >9,6 | >9,6 |
| Polystyrene | 0,85 | 7,73 | 1,72 | >7,6 | >7,6 | 6,66 |

*Santoprene is a thermoplastic rubber which consists of an intimate mixture of polypropylene and EPDM rubber. It is a trademark of and is supplied by Monsanto Inc.
>Strength, indicates that the substrate broke before the adhesive.

This shows that DBU and Compound III have similar results on low surface energy substrates but Compound III is superior on all normal plastic substrates when cured for 10 minutes and on nylon, polycarbonate and polystyrene when cured for 24 hours.

Table 7 gives the results of a mixture of Compound IV (0,04%) and Compound III (0,1%) both dissolved in Freon TA. The control is Pratley Super Glue with no primer.

TABLE 7

| SUBSTRATE | 10 MINUTE CURE | | | 24 HOUR CURE | | |
|---|---|---|---|---|---|---|
| | Control | III | III + IV | Control | III | III + IV |
| Low Density Polyethylene | Nil | 1,36 | 1,42 | Nil | 3,05 | 2,93 |
| High Density Polyethylene | Nil | 2,84 | 3,04 | 0,92 | 5,54 | 5,72 |
| Polyethylene Homopolymer | Nil | 5,70 | 3,36 | 0,68 | 9,77 | 11,14 |
| Nylon [Polyamide] | Nil | 2,07 | 2,26 | 9,35 | 10,13 | 4,61 |
| Polycarbonate | Nil | 3,07 | 2,94 | 11,11 | 17,41 | 8,93 |
| Polymethyl-methacrylate | Nil | >8,2 | 1,07 | 2,08 | >8,2 | 7,90 |

>Strength indicates that the substrate broke before the adhesive. This shows that a mixture of Compound IV and Compound III can be used but Compound III alone is better.

Table 8 gives the results of various primers on different substrates:

n-Octylamine (disclosed in EP 0295013) (OA) 1% in Freon TA Tetrabutyl ammonium fluoride (disclosed in EP 0333448) (TBAF) 0,25% in trichloroethane 2-Methyl-imidazole (disclosed in JP 0245572) (2MI) 0,1% in Freon TA Zirconium acetylacetonate (disclosed in JP 02117967) (ZAA) 0,1% in Freon TA
compared with a control using Pratley Super Glue with no primer. All adhesives cured for 24 hours.

TABLE 8

| SUBSTRATE | Control | III | OA | TBAF | 2MI | ZAA |
|---|---|---|---|---|---|---|
| Low Density Polyethylene | Nil | 3,05 | 1,27 | 2,06 | 2,75 | 1,32 |
| High Density Polyethylene | 0,92 | 5,54 | 4,10 | 1,78 | 6,97 | 0,74 |
| Polyethylene Homopolymer | 0,68 | 9,77 | 3,38 | 3,99 | 7,04 | 3,95 |
| Nylon [Polyamide] | 9,35 | 10,13 | 3,12 | 2,66 | 2,04 | 6,29 |
| Polycarbonate | 11,11 | 17,41 | 8,21 | 7,85 | 6,94 | >20,03 |
| Polymethyl-methacrylate | 2,08 | >8,2 | 6,65 | 2,98 | 3,25 | >8,2 |

This shows that 2MI is good on low surface energy substrates but poor on normal plastics and conversely ZAA is the reverse. However Compound III is good on both types of plastics. OA and TMAF are only fair on all the plastics.

Table 9 gives a comparison of different mixtures of primers with the primers alone and a control using Pratley Super Glue with no primer.

TABLE 9

| SUBSTRATE | Control | IV | 2MI | ZAA | 0,1% IV 0,1% ZAA | 0,1% 2MI 0,1% ZAA |
|---|---|---|---|---|---|---|
| Low Density Polyethylene | Nil | 4,3 | 2,75 | 1,32 | 3.45 | 3,08 |
| High Density Polyethylene | 0,92 | 3,00 | 6,97 | 0,74 | 5,16 | 8,15 |
| Prolypropylene | 0,68 | 6,15 | 7,04 | 3,95 | 10,67 | 9,66 |
| Polycarbonate | 11,11 | 7,03 | 6,94 | >20,03 | 6,48 | 7,50 |
| Polymethyl-methacrylate | 2,08 | 1,70 | 3,25 | >8,2 | 9,88 | 3,96 |

This table shows that primers which are good only on low energy plastics can be upgraded by mixing with ZAA to perform better on normal plastics but the overall performance is still not as good as Compound III.

We claim:

1. A method of bonding a first plastic substrate which is conventionally difficult to bond comprised of a plastic material selected from the group consisting of a plastic material with a low surface energy and a highly crystalline plastic material to a second plastic substrate with cyanoacrylate adhesive comprising the steps of:

(i) treating the first plastic substrate or the second plastic substrate or both the first plastic substrate and the second plastic substrate with a primer for the promotion of bonding of the two plastic substrates with the cyanoacrylate adhesive, which primer is a compound of the formula:

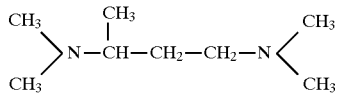

(ii) applying the cyanoacrylate adhesive to the first plastic substrate or to the second plastic substrate or to both the first plastic substrate and the second plastic substrate; and (iii) adhering the first plastic substrate to the second plastic substrate.

* * * * *